E. A. THOMAS & W. V. RITTER.
ROTARY EXPLOSIVE ENGINE.
APPLICATION FILED JUNE 3, 1909.

962,064.

Patented June 21, 1910.
5 SHEETS—SHEET 1.

FIG. I.

WITNESSES:
Harry A. Beines
Jos. A. Michels

INVENTORS.
Elmer A. Thomas and
Wm. V. Ritter.
BY Emil Starek
ATTORNEY.

E. A. THOMAS & W. V. RITTER.
ROTARY EXPLOSIVE ENGINE.
APPLICATION FILED JUNE 3, 1909.

962,064.

Patented June 21, 1910.
5 SHEETS—SHEET 3.

WITNESSES:
Harry A. Bennes.
Jos. A. Michel

INVENTORS.
Elmer A. Thomas
Wm. V. Ritter.
BY
Ernest Ritter
ATTORNEY.

E. A. THOMAS & W. V. RITTER.
ROTARY EXPLOSIVE ENGINE.
APPLICATION FILED JUNE 3, 1909.

962,064.

Patented June 21, 1910.
5 SHEETS—SHEET 4.

WITNESSES:
Harry A. Beimer
Jos. Michel

INVENTORS.
Elmer A. Thomas and
Wm. V. Ritter.
BY
Ernst Storer
ATTORNEY.

E. A. THOMAS & W. V. RITTER.
ROTARY EXPLOSIVE ENGINE.
APPLICATION FILED JUNE 3, 1909.

962,064.

Patented June 21, 1910.

5 SHEETS—SHEET 5.

WITNESSES:
Harry A. Benner
Jos. a. michel

INVENTORS.
Elmer A. Thomas
Wm. V. Ritter.
BY
ATTORNEY.

UNITED STATES PATENT OFFICE.

ELMER A. THOMAS AND WILLIAM V. RITTER, OF ST. LOUIS, MISSOURI.

ROTARY EXPLOSIVE-ENGINE.

962,064.

Specification of Letters Patent.

Patented June 21, 1910.

Application filed June 3, 1909. Serial No. 499,924.

*To all whom it may concern:*

Be it known that we, ELMER A. THOMAS and WILLIAM V. RITTER, citizens of the United States, residing at St. Louis, State of Missouri, have invented certain new and useful Improvements in Rotary Explosive-Engines, of which the following is a full, clear, and exact description, reference being had to the accompanying drawings, forming a part hereof.

Our invention has relation to improvements in rotary-cylinder explosive engines; and it consists in the novel construction and arrangement of parts more fully set forth in the specification and pointed out in the claims.

Figure 1:
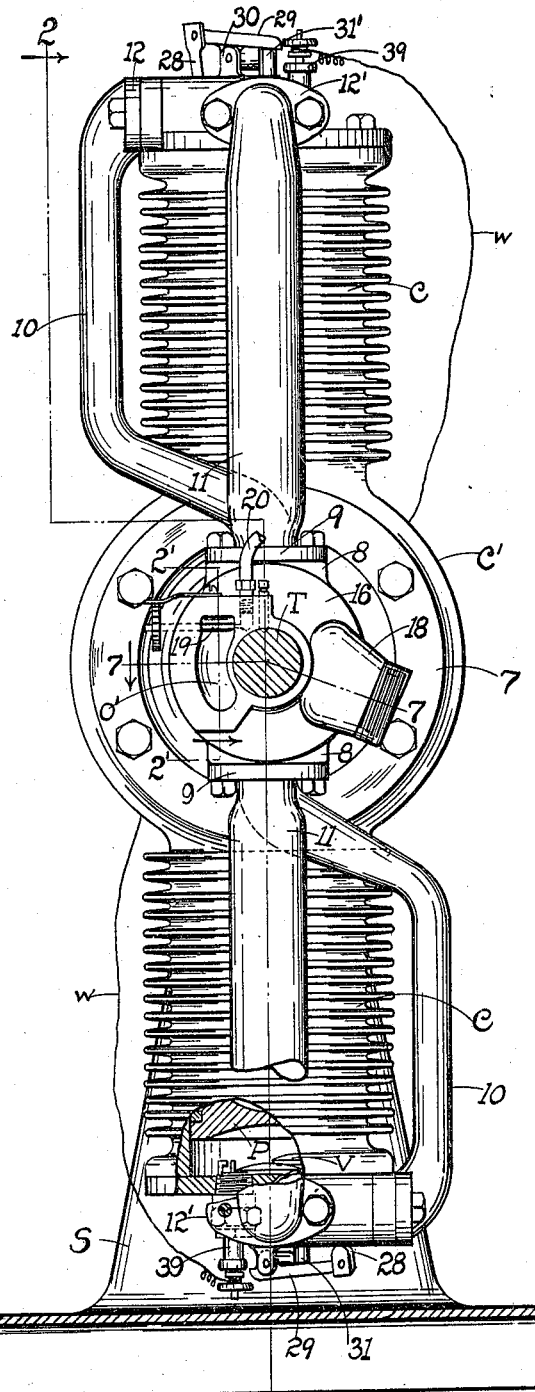
Figure 2:
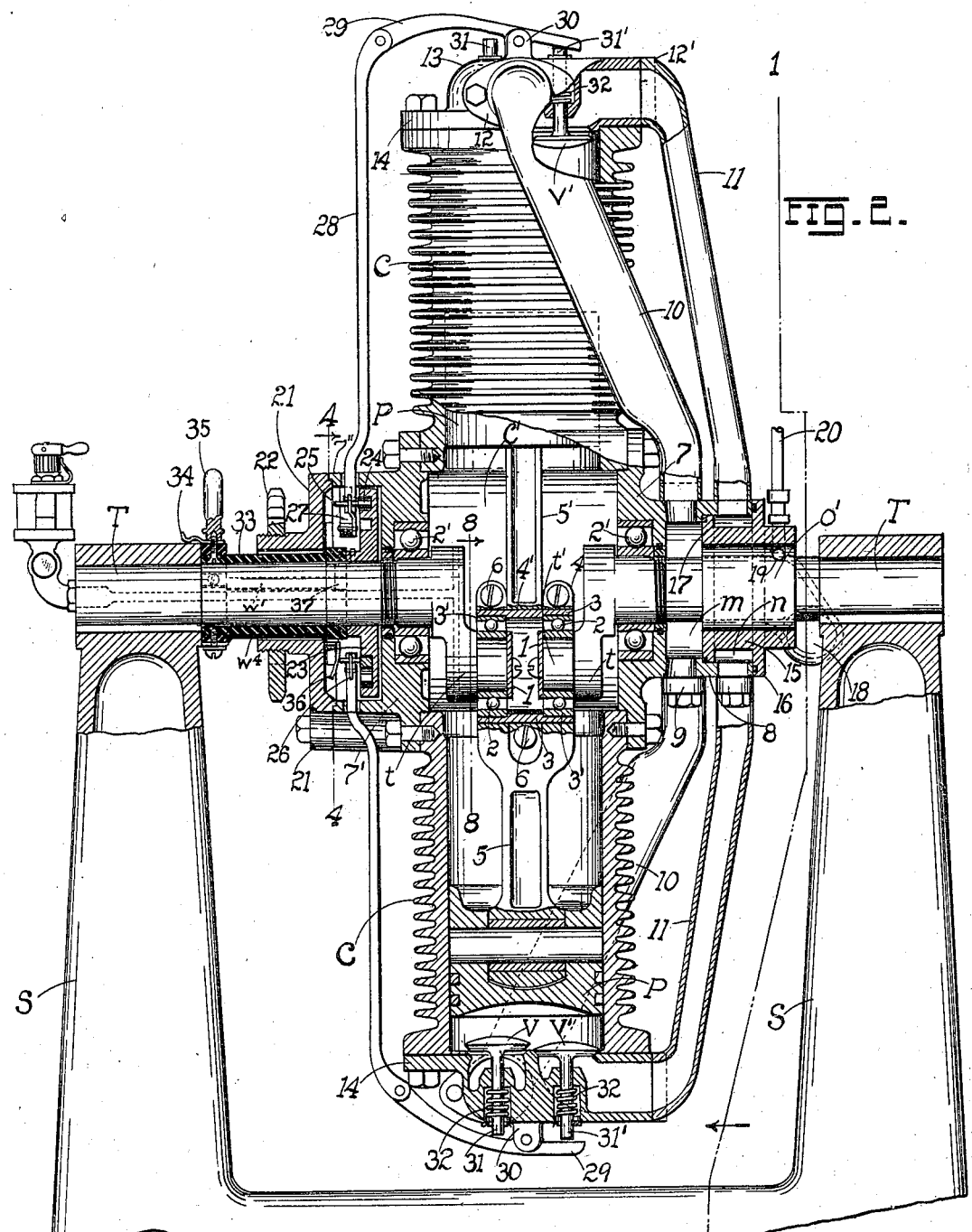
Figure 3:
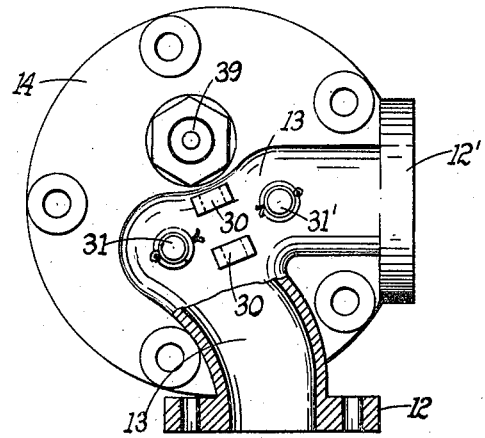
Figure 4:
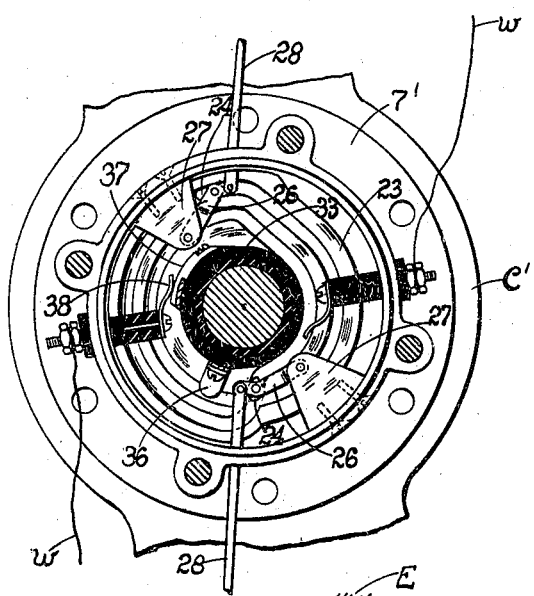
Figure 5:
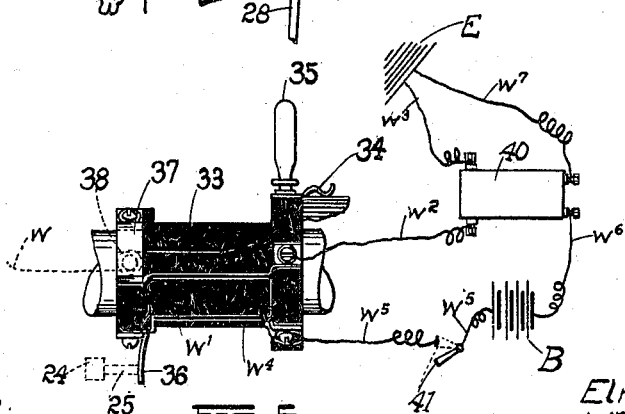
Figure 6:
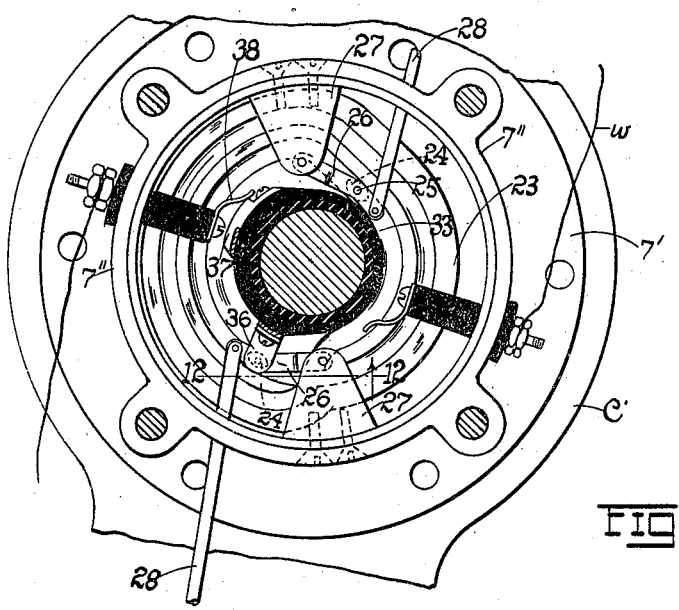
Figure 7:
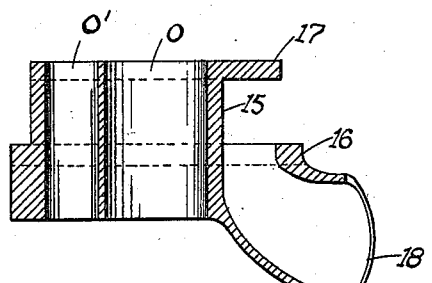
Figure 8:
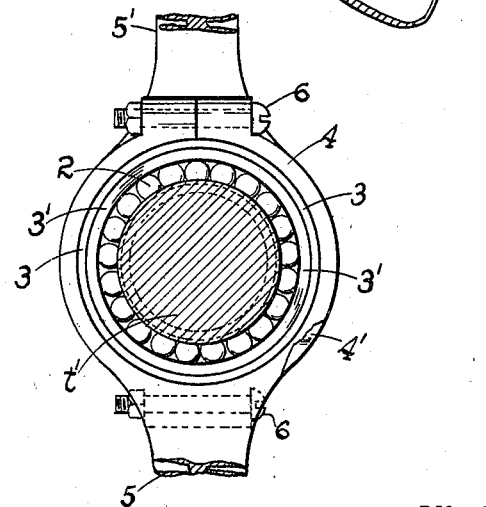
Figure 9:
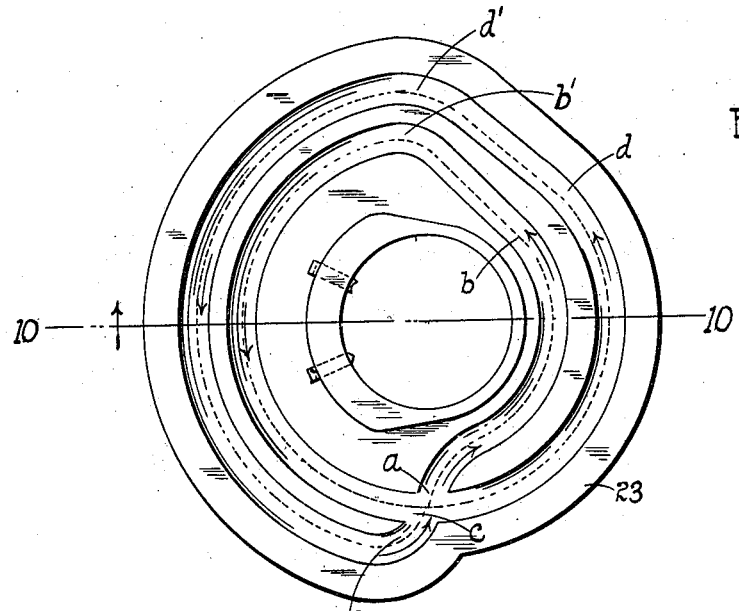
Figure 10:
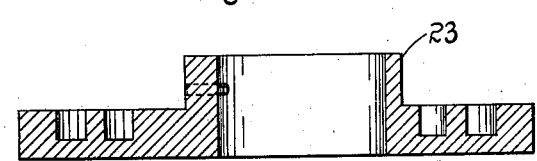
Figure 11:
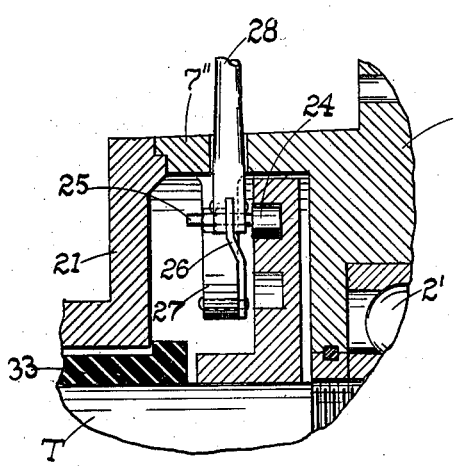
Figure 12:
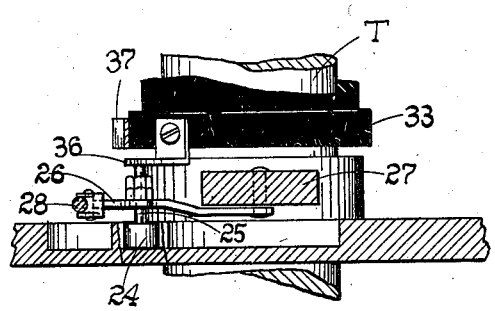

In the drawings, Figure 1 is a vertical transverse section of the engine on the line 1—1 of Fig. 2; Fig. 2 is a combined side elevation and vertical section on the line 2—2 of Fig. 1, the section of the mixing valve however, being confined to the plane of section on the line 2'—2' of Fig. 1; Fig. 3 is an end view of the outer cylinder head, parts being broken away; Fig. 4 is a vertical transverse section on the line 4—4 of Fig. 2, showing an end view of one of the central casing heads, and showing the position of the dog traversing the cam track after making electric contact to effect explosion; Fig. 5 is a detached view of the insulating sleeve with a diagrammatic illustration of the wiring to the battery or equivalent source of electric energy; Fig. 6 is a view similar to Fig. 4 slightly enlarged showing the contacting or sparking position of the dog; Fig. 7 is a horizontal section of the mixing valve on the broken line 7—7 of Fig. 1; Fig. 8 is a transverse vertical section on the line 8—8 of Fig. 2, showing the manner of anchoring the inner ends of the piston rods; Fig. 9 is an enlarged face view of the cam-plate showing track over which the dog travels; Fig. 10 is a cross-section on line 10—10 of Fig. 9; Fig. 11 is an enlarged radial sectional detail through the head carrying the dog traversing the cam-track; and Fig. 12 is a sectional detail of the corresponding parts on the line 12—12 of Fig. 6.

The object of our invention is to construct a rotary-cylinder reciprocating-piston type of explosive engine which will develop a maximum efficiency by reason of a reduced number of operating parts accurately balanced and symmetrically disposed about the axis of rotation of the cylinders (there being a cylinder on either side of such axis); one in which the valve-controlling mechanism is in compact relation to the body of the cylinder leaving no parts projecting to any objectionable extent beyond the cylinder walls thereby reducing the bulk of the revolving mass; one requiring a minimum amount of attention and repair; and one possessing further and other advantages better apparent from a detailed description of the invention which is as follows:—

Referring to the drawings, S, S, represent a pair of standards between which are rigidly secured the cylindrical trunnions T provided with inner right angled offsets or arms $t, t$, each of which is provided with a stud or boss $t'$, the bosses being spaced a slight distance apart as shown (Fig. 2). Each stud or boss is provided with a cap-piece 1 having a track for the travel and support of the anti-friction balls 2, the latter being confined between such cap-pieces and an encompassing ring 3 provided with wearing bands or rings 3' for the balls, the ring 3 being embraced at its ends by the straps 4 of the inner forked end of the piston-rod 5, and at its middle being embraced by the straps 4' at the inner end of the piston-rod 5', the ends of the straps being connected in each case by bolts 6. The outer end of each piston-rod 5, 5' is connected to a piston P, operating in a cylinder C, the outer walls of which are ribbed as shown to facilitate cooling, as well understood in the art. The manner of connecting the fixed ends of the piston-rods 5, 5' to the studs $t$, as described, need not be adhered to, as other methods of effecting the connection may be devised by the skilled mechanic, but the present method permits of a rapid assembling and disassembling of the parts. The bases of the cylinders C, enlarge into a common cylindrical casing or chamber C' whose axis is transverse to the common axis of the cylinders C, C, said chamber C' being closed by the cylinder heads 7, 7', which revolve about the ball-bearings 2' confined in suitable pockets in the heads and running on the trunnions T, as fully shown in Fig. 2.

Projecting from the center of the head 7 and surrounding the trunnion T is a cylindrical ring or hub 8 to the sides of which are bolted the plates 9, 9 into which are fitted the inner ends of the supply and exhaust pipes 10, 11, respectively, the outer ends of the respective pipes being secured to the flanges 12, 12' of the branches of the elbow formation 13 cast with the outer cylinder head 14. Firmly secured to the trunnion T, and passed loosely and partially into the hub 8 is a peculiarly shaped ring 15 (Figs. 2, 7) provided with a cylindrical opening $o$ for the passage therethrough of the trunnion T, and having an outer flange formation 16 which bears against the end of the hub 8 and limits the depth of insertion of the ring into said hub. The rear end of the ring terminates in a flange 17 which, together with the flange 16, serves to divide the chamber of the hub 8 into two distinct compartments or chambers, namely an annular chamber $m$ from which the supply pipes 10 lead, and an adjacent exhaust chamber $n$ into which the exhaust pipes 11 discharge, the contents of the chamber $n$ being carried out by the discharge nozzle 18. Formed in the ring 15 adjacent to the passage $o$ is an opening $o'$ traversed at a convenient point by the stem of a needle valve 19 which is adjusted to regulate into the opening $o'$, the flow of the gasolene sprayed thereinto from the gasolene supply pipe 20. The pipe 20 as shown discharges into a suitable passage-way in the ring 15 leading to the opening $o'$. As the gasolene is sprayed into the opening or chamber $o'$ the atmospheric air will be drawn into the opening and the suitable mixture thus effected will flow into the annular chamber $m$ which may for convenience be termed the supply or storage chamber. For further convenience the ring 15 with its attachments (the whole forming a single casting) may be termed a mixing valve or mixing chamber, since it is within the opening or passage $o'$ that the mixing of the gasolene and air takes place; and it is thus around this mixing valve that the exhaust chamber $n$ is located (Fig. 2).

It may be stated in passing that the mixing valve is stationary on its supporting trunnion T, the hub 8 with the cylinder head 7 revolving freely around the trunnion. The head 7' on the other hand is provided with a flange 7'' to which is bolted a cover-plate 21, said plate having a hub portion to which is secured a sprocket wheel 22 from which power may be transmitted to any suitable point. Keyed, or otherwise rigidly secured to the trunnion T, adjacent to the head 7' and within the flange 7'', and confined between the head and the cover-plate 21, is a cam-plate 23 having track formations substantially as shown in Figs. 4, 6 and 9. These track formations or grooves are traversed by a shuttle or dog 24, there being one dog identified with each cylinder C. The stem 25 of the dog is rotatably mounted in a bent link 26 one end of which is pivotally attached to a lug or ear 27 projecting inwardly from the flange 7'', the opposite end of the link being pivotally secured to a connecting rod 28 projecting loosely through the flange 7'', the outer end of the rod being pivotally coupled to the end of a long arm of a lever 29 pivoted between the ears 30 on top of the elbow formation 13 on the cylinder head 14. The respective arms of the oscillating lever 29 engage the stems 31, 31' of the reciprocating intake and exhaust valves V, V', said valves controlling the passage-ways or ports respectively communicating with the inlet and exhaust pipes 10, 11. The valves are normally held to their seats by springs 32 which are compressed with the opening or unseating movement of the valve. It will be apparent that if we pull inwardly on the rod 28, it will oscillate the lever 29 in a direction to depress or unseat the intake valve V; if we push outwardly it will oscillate the lever to unseat the valve V'.

In Fig. 2, the intake valve of one cylinder is open, and the exhaust valve of the opposite cylinder is open; and when the levers 29 are tilted so as to occupy an intermediate position, or one which will allow for the disengagement or release of both valves, then both valves will be closed. The positions of the valves are controlled by the traverse of the dog 24 in the sinuous track of the cam-plate.

Referring preferably to Fig. 9, we see that as the dog 24 travels from the point $a$ to point $b$, in which traverse it approaches the center of the cam-plate, it will draw or pull on the rod 28 and open the valve V. Between the points $b$, $b'$ it begins to recede from the center or axis of the cam-plate, (such center corresponding to the axis of rotation of the cylinders) thereby pushing on the rod 28 and allowing both valves to close; from $b'$ to $c$ the traverse is along a track section concentric with the arc of which the point $b'$ forms one terminal and both valves continue to be closed, such closed position being further continued till the dog reaches the point $d$.

Between $d$ and $d'$ the dog is receding from the axis of the cam-plate thereby pushing on the rod 28 and oscillating the lever 29 to cause its short arm to depress the valve V' and allow the valve V to close, after which the dog traverses the arc from $d'$ to $e$ which is concentric with the arc of which the point $d'$ forms one terminal, and the valve V' continues to remain open. This brings the dog back to the point $e$ whence it at once intersects the point $c$ resuming its first path from $a$ to $b$. In the traverse of the dog from $a$ to $e$ it is apparent that two rotations of the cylinder are necessary since in such traverse the dog has traveled 360 degrees. The traverse from $a$ to $b$ corresponds to approximately a half rotation of the cylinder during which the open valve V admits the explosive mixture from the chamber $m$ into the cylinder and behind the receding piston. The valve V closing for a traverse of the dog between $b$ and $b'$ allows the cylinder to rotate for a closed position of both valves for substantially another half revolution during which time the charge previously admitted is compressed, the piston in such second half revolution reciprocating toward the outer end of the cylinder and the dog traveling from $b'$ to $c$; for the third half revolution, (between the points $c$, $d$) the explosion takes place, driving the piston inwardly, the exhaust valve opening between $d$ and $d'$. From $d'$ to $e$ on the last half revolution, the exhaust valve V' remains open allowing the spent gases to escape into the chamber $n$ and thence out through the exhaust nozzle 18. We thus have a four cycle engine, an explosion taking place once in two rotations of the cylinder, or in four reciprocations of the piston. Since both cylinders operate alike an explanation of one will suffice for the other. It is apparent that since the cylinder rotates about one axis (the axis of the trunnion T) and the piston revolves about an axis eccentric thereto, namely about the axis of the stud $t'$, the piston will reciprocate back and forth in the cylinder while revolving about the axis of the stud $t'$, and while the cylinder is rotating about the axis of the trunnion T.

The explosion of the gases within the cylinder is brought about by the closing of certain electric circuits into which the dog is brought at the proper time, and which may be described as follows:—Passed over one of the trunnion sections T on the side of the engine opposite the head 7' and loosely enveloped by the hub of the cover-plate 21 is an insulating sleeve 33 held in position on the trunnion by a securing spring 34 which bears against the outer cylindrical surface of the trunnion bearing on top of the standard S, (Fig. 2). The outer end of the sleeve is provided with a handle 35 by which the sleeve may be manipulated and rotatably adjusted to any position on the trunnion. The inner end of the insulating sleeve terminates in a slight enlargement or flange to which is secured a metallic wiper 36 which is so positioned as to rub up against the stem 25 of the dog 24 when the dog happens to occupy the position approximately at the point $c$, this (or any point on the arc $b'$, $c$, $d$) constituting the only position of the dog which allows the stem 25 thereof to rub against the wiper 36. In other words, the stem 25 and wiper 36 come together once for every two revolutions of the cylinder. The link 26 is so bent that the wiper 36 clears the ear or lug 27 in the rotation of the latter about the axis of the trunnion T (Fig. 12), so that only the stem 25 can engage the wiper. Secured to the insulating sleeve 33 within the chamber of the head 7' is a contact block 37 which in the rotation of the cylinder is engaged by an insulated wiper 38 secured to the flange 7'' of the rotating head 7', a wire $w$ leading from the securing screw of said wiper to the spark-plug 39 at the outer end of the cylinder C. From the block 37 there runs along the sleeve 33 a wire $w^1$, thence extending as wire $w^2$ to the spark coil 40 whence it extends as wire $w^3$ to the engine body or frame E (see Fig. 5), so that together with wire $w$ leading to the spark-plug, the sparking circuit is completed. This spark circuit however, is only effective upon the closing of the primary battery circuit which happens when the wiper 36 rubs up against the stem 25 of the dog 24. From the wiper 36 extends along the sleeve 33 a wire $w^4$ whence it is continued as wire $w^5$ through the switch 41 (shown open in Fig. 5) to the battery B, thence as wire $w^6$ to the primary coil (within the spark coil), thence as wire $w^7$ to the machine-frame E, (the same frame with which the dog 24 is identified). So that, upon the closing of the primary circuit by the passing of the wiper 36 over the stem 25 of the dog, the spark circuit will be induced in the spark-coil, (as the wiper 38 is passing over the contact block 37) and the sparking of the current explodes the mixture within the cylinder at the proper moment. Of course, the wiper 36 is spaced from the block 37 at the proper distance to effect a simultaneous contact between the wiper 38 and block 37, and wiper 36 and stem 25 respectively whenever the dog 24 occupies the position near the point $c$ on the cam-plate. The rubbing of the wiper 38 against the contact block 37 for any other position of the dog can have no effect on the spark plug, as we must first have a closed primary circuit before we can have a secondary or induced spark circuit. The spark coil is here illustrated only conventionally, and any standard coil on the market will answer the purpose. To close the primary circuit, of course, the switch 41 must be swung to closed position as is obvious.

In assembling the machine, no special care need be observed as to the position of either dog on the cam-track. The dogs will adjust themselves, and once the engine is started they will follow each other at proper distances apart, each dog sparking its own cylinder. To start the engine the cylinders are first given a turn by hand, the switch 41 closed, the gasolene turned on, after which the engine will propel itself. The operation having been described in connection with the description of the details, need not again be reviewed at this point.

From an inspection of Figs. 4, 6 and 9 it will be seen that the position of the wiper 36 is opposite the arc of traverse of the dog 24 while the latter is passing over the concentric portions of the cam-track between $b'$ to c, and c to d, and the stem 25 of the dog will strike the wiper no matter to what position the sleeve 33 may be turned. As illustrated, (Fig. 6) the sleeve has been set so as to bring the wiper approximately opposite the point marked c in Fig. 9, so that it is at this point at which contact occurs and an explosion results. For that position of the dog (Fig. 6) the piston P has about completed its compression stroke and is probably receding inwardly, this arrangement resulting in a rapid rotation for the cylinder. If the sleeve 33 be set so that the wiper 36 will be nearer the point d, by which time the piston has traveled a greater distance inwardly the explosion will take place later, and the engine will slow down. Thus by simply seizing the handle 35 and giving the sleeve 33 a slight turn, the point of explosion may be carefully adjusted relatively to the stroke of the piston. What is true of one dog is true of the other, both cylinders operating alike. The link 26 of course, allows the dog all the latitude to traverse the sinuous track of the cam-plate.

Having described our invention, what we claim is:

1. In an explosive engine, a cylinder rotatable about a transverse axis, a mixing valve disposed about said axis on one side of the cylinder, a piston for said cylinder, a pipe conducting the mixture from the mixing valve to the outer end of the cylinder behind the piston, an exhaust pipe leading from said cylinder end to a point contiguous to the walls of the mixing valve, valves for controlling the passages from the aforesaid pipes into the cylinder, a member having a cam-track disposed about the axis of rotation of the cylinder on the opposite side of the cylinder, a dog traversing the cam-track, intermediate connections carried by the engine between the dog and valves for actuating the latter with the rotation of the cylinder, and electric spark-devices controlled by the dog in the travel of the latter along the cam-track.

2. An explosive engine comprising a pair of cylinders with adjacent ends spaced apart, a transversely disposed crank-shaft about the axis of which the cylinders rotate, a crank on said shaft located in the space between the cylinders and eccentric to the axis of rotation of the cylinders, pistons operating in the cylinders and revolving about the crank aforesaid, a mixing valve disposed about the crank-shaft, a pipe for conducting the explosive mixture from the mixing valve to the outer end of each cylinder, an annular exhaust chamber located adjacent to the mixing valve, exhaust pipes connecting said chamber with the outer ends of the respective cylinders, valves in the cylinders for controlling the passage of the explosive mixture into, and the spent gases out of the cylinders, a cam-plate provided with a cam-track disposed about the axis of rotation of the cylinders on the side opposite from the mixing valve, dogs traversing the cam-track, intermediate link connections between each dog and the valves of its respective cylinder for actuating the valves, spark-plugs, and means for electrifying the plugs by the rotation of the cylinders and exploding the mixture, the parts operating substantially as set forth.

3. In an explosive engine, a cylinder rotatable about a transverse axis, a stationary mixing valve disposed about said axis on one side of the cylinder, a piston for said cylinder, a pipe arranged to conduct the mixture from the mixing valve to the outer end of the cylinder behind the piston, an exhaust pipe leading from said cylinder end to a point contiguous to the walls of the mixing valve, valves for controlling the passages from the aforesaid pipes into the cylinder, a cam-plate provided with a cam-track disposed about the axis of rotation of the cylinder on the opposite side of the cylinder, a dog traversing the cam-track, intermediate connections carried by the engine between the dog and valves for actuating the latter with the rotation of the cylinder, a spark-plug, and an electric circuit adapted to be closed by the dog at a predetermined point of its travel and electrifying the spark-plug, substantially as set forth.

In testimony whereof we affix our signatures, in presence of two witnesses.

ELMER A. THOMAS.
WILLIAM V. RITTER.

Witnesses:
 EMIL STAREK,
 JOS. A. MICHEL.